Oct. 2, 1962

C. A. BORCK ETAL 3,056,925

RADIO POWER DENSITY PROBE

Filed June 29, 1959

INVENTORS
CHARLES ALAN BORCK
KENNETH WILLIAM KNAPP

By Richard A. Marsen
their attorney

Oct. 2, 1962
C. A. BORCK ETAL
3,056,925
RADIO POWER DENSITY PROBE
Filed June 29, 1959
2 Sheets-Sheet 2
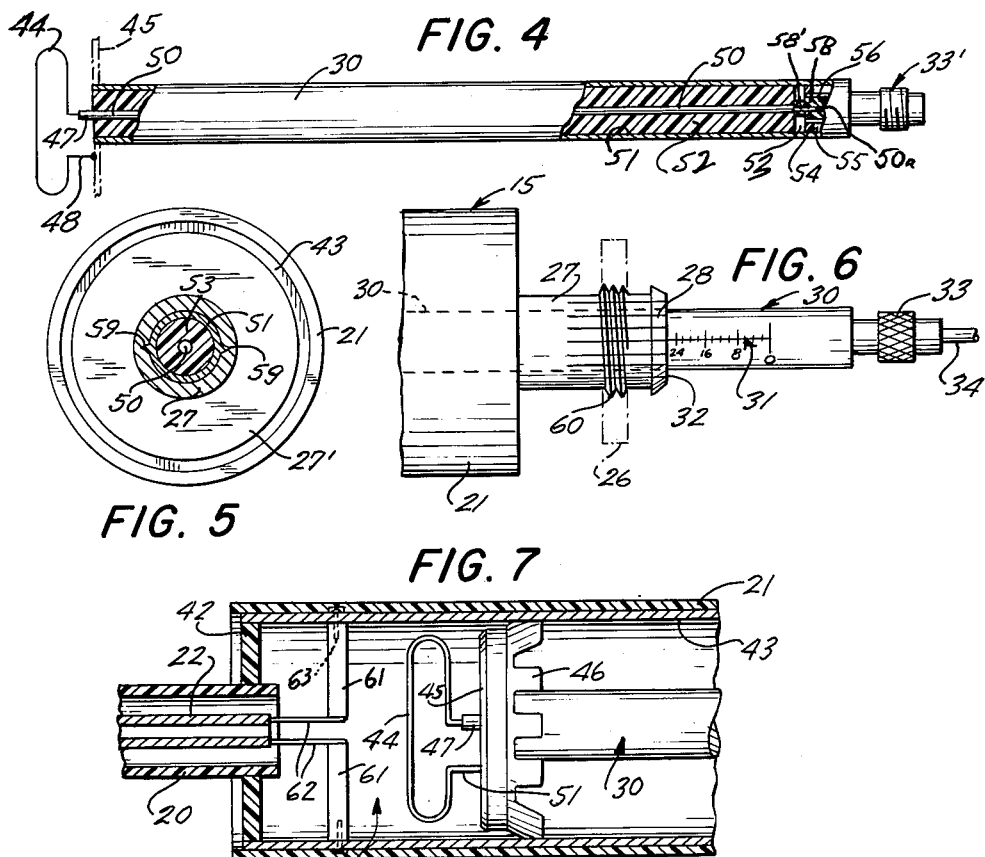
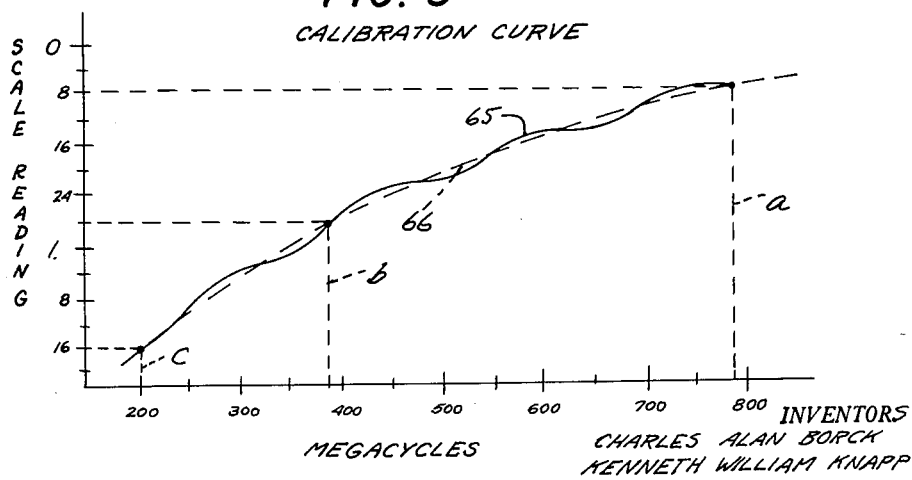
INVENTORS
CHARLES ALAN BORCK
KENNETH WILLIAM KNAPP
By Richard A. Marsen
their attorney

United States Patent Office 3,056,925
Patented Oct. 2, 1962

3,056,925
RADIO POWER DENSITY PROBE
Charles Alan Borck, Schenectady, and Kenneth W. Knapp, Scotia, N.Y., assignors to Empire Devices, Inc., Amsterdam, N.Y.
Filed June 29, 1959, Ser. No. 823,467
9 Claims. (Cl. 325—67)

This invention relates to apparatus for the direct measurement of the field intensity of radio frequency waves, and more particularly relates to the measurement of power density of such waves above the order of 200 megacycles.

In accordance with the present invention a novel broad band radio frequency probe is utilized as a transducer to convert power density of radio waves to a predetermined constant power into an unbalanced line. A conventional power bridge with an unbalanced line input is connected to the aforesaid transducer and calibrated to read in terms of absolute power. The novel radio frequency probe hereof is used to convert input fields of high power density to relatively low signal power levels for the bridge meter. In this manner high density fields that are hazardous for personnel can be directly measured with a portable relatively inexpensive probe immersed in the power field.

The invention system utilizes an absolute power meter that indicates power densities of the order of one milliwatt to one watt per square centimeter, and higher. The invention probe is usable in high density fields and near field intensity measurements over its designed frequency range. It is usable for the detection of hot spots and leakage near antennas, antenna feeds and other high powered components. It is also useful in connection with the area about long range radar, early warning radar, etc.

It has heretofore been the practice to probe radio fields by tunable resonant elements, and conduct resultant substantial power through attenuators and indicating equipment. However, where high powered densities are involved such methods are impractical for portable equipment. For example, it would be necessary, using conventional prior art measuring devices with dissipative attenuators, to dissipate up to approximately 1800 watts to provide the range of measurement that the present invention affords. Such prior apparatus was bulky, heavy and costly. Also, there was always the problem of overloading and burning out the meter indicator. The present invention is a low powered arrangement.

In accordance with the present invention we provide a novel tunable probe incorporating a below cut-off wave guide. The invention probe is preset to the frequency of the field measurements. The probe is constructed to convert the incident power density to constant power output over a predetermined frequency range, e.g. 200 to 800 megacycles. The below cut-off wave guide accomplishes this without the use of dissipative attenuators or other elements that result in heating or wasted power within the apparatus.

The below cut-off wave guide in the exemplary unit is cylindrical in shape and arranged with coupling units that, for the indicated frequencies, act as a filter reflecting power providing a predetermined relationship of output energy to the incident energy. A lightweight relatively inexpensive portable probe results that remains cool and accurate under all operating conditions. The exemplary probe further, is constructed to have an unbalanced line output of predetermined impedance, such as 50 ohms. This affords a balanced to unbalanced arrangement that is useful for connection of the probe directly to a conventional power bridge meter.

The power density probe of this invention comprises an adjustable one-half wave length dipole mounted at the end of a boom within which is a balanced cable or conductor to impress the picked-up signals to the input of a cylindrical wave guide proportioned to be below cut-off for the frequency range of the probe. The effective length of the wave guide is adjustable by a movable transverse plate, preset in accordance with the frequency of the power density to be measured, being calibrated through a rod with a scale. A pick-up loop is mounted on the movable plate, thereby being correspondingly spaced from a stationary excitation input to the wave guide. The pick-up loop has one side grounded to provide the unbalanced output line connection.

The probe unit hereof is positioned at the location of the radio field to be measured. Its adjustable dipole is resonantly tuned by the length of the dipole elements exposed, in accordance with a frequency scale. The below cut-off wave guide is also preset, through its movable plate and rod in accordance to the frequency, as will be detailed hereinafter. The result is that a predetermined power level relationship obtained at the output of the probe when it is immersed in a power density field at the preset frequency.

The exemplary probe, for example, may be designed to deliver one watt of energy into an unbalanced 50 ohm line when its antenna is immersed in a one watt per square centimeter field. By connecting a conventional power bridge to the 50 ohm line, the meter scale reads directly in power density. An attenuator incorporated in the bridge meter circuit can adapt the probe for use in power density measurements below its direct one watt per square centimeter value, as for example, in several scale steps down to one milliwatt mid-scale reading. The novel power density probe system of the present invention thus can be used for broad band measurements, directly in milliwatts per square centimeter to watts per square centimeter, with simple rugged portable equipment.

The units of the invention system are effectively shielded to make them insensitive to stray radio frequency fields. Also, they readily withstand large power overloads due to the wide power handling capacity. The simplicity of operation and portability of the system makes it very easy to use. There is no heating up of the equipment due to high power density immersion or measurement. Further, there is no likelihood of burning out sensitive elements of the power meter with the invention probe.

It is accordingly an object of the present invention to provide a novel radio power density probe and measuring system.

Another object of the present invention is to provide a novel near field frequency probe inorporating an adjustable below cut-off wave guide.

A further object of the present invention is to provide a novel portable relatively inexpensive radio power density measuring system that withstands large power overloads, and does not appreciably heat up during its immersion in intense radio fields.

Still another object of the present invention is to provide a novel radio power density probe combining an adjustable antenna and a below cut-off wave guide settable for frequencies over a wide range, delivering a signal output at the probe terminals in magnitude calibrated to correspond with that impressed at the probe antenna.

Still a further object of the present invention is to provide a novel radio frequency power density probe that is accurately calibrated over a wide frequency range, e.g. 200 to 800 megacycles, whereby the power output of the probe corresponds to the power density input over the frequency range.

These and further objects of the present invention will become more apparent in the following description of the exemplary embodiment, illustrated in the drawings, in which:

FIG. 4 is a cross-sectional view longitudinally through the adjustable probe element, taken along the line 4—4 of FIG. 3.

FIG. 5 is a partial cross-sectional view through the exemplary probe, taken along the line 5—5 of FIG. 3 in the direction of the arrows.

FIG. 6 is an enlarged elevational view of the calibrated adjusting section at the probe end.

FIG. 7 is a partial interior sectional view of the probe, illustrating a modified form of interior coupling.

FIG. 8 is a calibration curve of the exemplary probe wave guide section.

Figure 1:
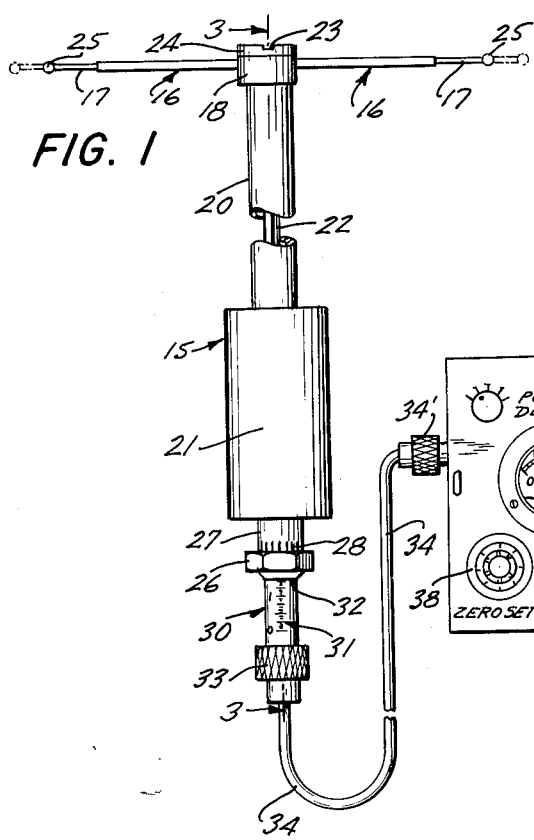
FIG. 1 is an elevational view of the exemplary radio power density probe and accompanying power bridge meter.

FIG. 1 illustrates the exemplary radio power density probe 15 in elevation. The probe 15 comprises dipole antenna arms 16, 16 having extendable sections 17, 17. The diploe antenna 16, 16 is set in support 18 of antenna boom 20. Boom 20 is of dielectric material, such as phenol fabric, and of tubular shape. The boom 20 extends from central insulation handle 21. A twin conductor cable 22 passes through the interior of boom 20, connecting dipole antenna 16, 16 to the below wave cut-off guide within handle 21.

The movable sections 17, 17 of the dipole antenna are extended with respect to the central slot 23 in top button 24 of the boom 20, in accordance with the particular frequency of the radio field to be measured. The tips 25, 25 of the dipole sections 17, 17 are positioned, as with a measuring rule, each equally from central slot 23, in accordance with a frequency chart. The dipoles 16, 16 are each adjusted to approximately ¼ wave length long and are thus made resonant to the frequency to be probed.

The adjustable below cut-off wave guide within handle 21 is also preset in accordance with the frequency to be probed or otherwise measured. This is accomplished by loosening lock nut 26 at the end of protruding guide 27. The slotted end 28 of section 27 thereupon becomes loosened to permit the positioning of the central coaxial assembly 30 with respect thereto. A calibration scale 31 is etched or otherwise impressed upon the projecting end of coaxial tube 30. The scale 31 is positioned with respect to the edge 32 of section 27, in accordance with a calibration curve or chart, to the frequency to be probed, as will be set forth in detail hereinafter.

Figure 2:
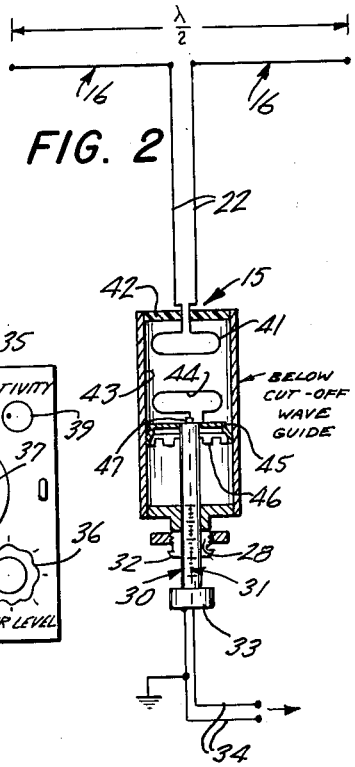
FIG. 2 is a schematic representation of the radio probe of FIG. 1.
Figure 3:
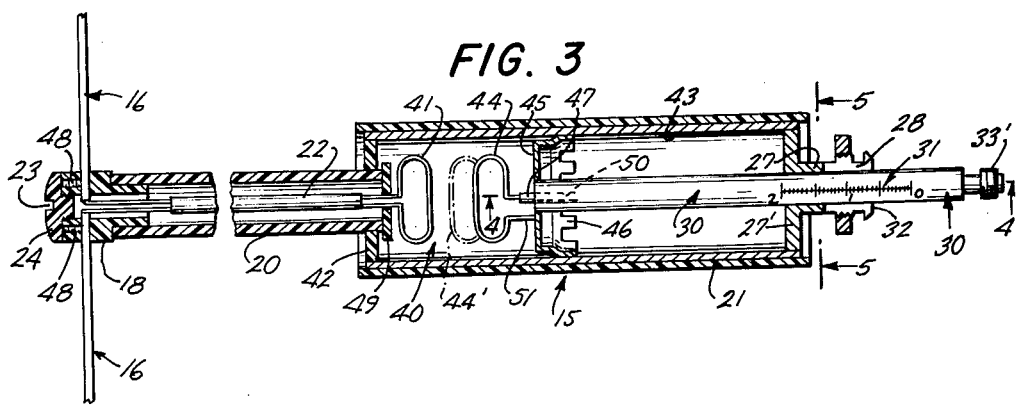
FIG. 3 is a cross-sectional view through the probe, taken along the line 3—3 of FIG. 1.

Edge 32 serves as an index for scale 31. Lock nut 26 is thereupon tightened on the milled slots 28 of section 27, to lock the coaxial tube 30 in its set scale relationship. The internal wave guide (40), see FIGS. 2 and 3, is thereby adjusted for the frequency to be probed to provide calibrated power output at the end connector 33 of the probe 15. Coaxial cable 34 conducts the output energy of probe 15 to the bridge meter 35, through a suitable coaxial connector 34'. Coaxial cable 34 may be of any suitable length to provide ample distance between the probe 15 at the radio power density site, for the operation of meter 35 remote therefrom.

In the exemplary meter 35 the power output energy of probe 15 is initially impressed, through coaxial cable 34, to an attenuator 36 that is set for the appropriate power level. The resultant power is measured in unit 35 by a thermistor element that is incorporated in a temperature compensated direct current bridge. The power detected by the thermistor changes the operating condition of the bridge, directly showing the power density on indicating meter 37. Details of the power bridge 35 circuit elements are not shown as they are in themselves well know in the art, and the invention system and probe are not limited to any particular metering device.

The meter 35, for example, may have an unbalanced 50 ohm line input at connector 34' that is suitably matched with a corresponding output impedance at connector 33 of probe 15, as will be further shown. The bridge meter 35 preferably incorporates a self-calibrating arrangement to check the zero balance and sensitivity of the bridge at all times. Towards this end a zero set control 38 and sensitvity control 39 are used. The exemplary indicating meter 37 is directly calibrated in watts per square centimeter, corresponding to its calibration with attenuator 36 set at X 1.0.

The power density readings of meter 37 are direct, and accurately measure the power density incident upon the resonant dipole antenna 16, 16. It is preferable to put the "1." reading, its nominal rating, center of the meter, with the range 1 to 2 being readable. It is of course feasible to construct the probe 15 and bridge meter 35 for higher or lower norminal power readings, within the principles of the invention hereof. The attenuator 36 may be moved to a different power level, for example X 0.1. Such setting adjusts the signal relationships whereby the meter 37 readings are multiplied by 0.1 for the probed field density values. Similarly, the attenuator settings for X 0.01 and X 0.001 are feasible, giving a one-thousand to one range in the instrument.

The exemplary probe and meter 15, 35 is accordingly directly usable with simple adjustment for absolute power measurements from 1 milliwatt to 1 watt per square centimeter (mid-scale). The frequency range of the exemplary unit is 200 to 800 megacycles per second for the reasonably sized portable dimensions thereof to be set forth. As stated, the dipole antenna 16, 16 and the below cut-off wave guide coaxial assembly 30 are preadjusted for the frequency of the field density to be measured. It is of course feasible to construct the probe to measure frequencies below 200 megacycles as well as above 800 megacycles if desired. The term "megacycles" as hereinafter used in the specification and claims is to be understood to refer to and mean the more technically complete expression "megacycles per second."

A practical probe (15) unit has been found to have a range of 200 to 800 megacycles, namely a 4 to 1 range, with a reasonable scale (31) and calibration settings. Also, another reason for the upper limit of 800 megacycles selected for the exemplary unit is the fact that for higher frequencies namely those extending beyond 800 megacycles, an alternate form of probe has been found suitable, effective and efficient. Such later probe system forms the basis of our copending application entitled "Microwave Power Density Probe," Serial No. 827,359, filed on July 15, 1959, and assigned to the assignee of this case.

The latter higher frequency probes are based on a below cut-off horn principle, and are constructed for direct use with a common calibrated bridge meter (35). We have found that reasonable sized horn probes of the said copending application are effective from about 750 megacycles on up to 10,000 megacycles in range, in two physical steps. One conical probe has been found to be practical from 0.75 kmc. to 4.0 kmc.; with a further one covering the band 3.75 kmc. to 10 kmc. Thus, with three lightweight relatively inexpensive probes, namely the latter two of the horn type, and the construction corresponding to probe 15 forming the basis of the present case, we are able to cover the broad band of 0.2 kmc. to 10 kmc. with a single power density meter 35. These three probe units and the meter are all portable and usable in the laboratory as well as out in the field.

FIG. 2 is a simplified showing of probe system 15. Adjustable dipole antenna 16, 16 is connected by coaxial cable 22 to insertion loop 41 at one of below cut-off wave guide 40. The loop 41 is supported on an insulation end piece 42. Twin conductor line 22 in the exemplary probe is a 72 ohm line. The below cut-off wave guide 40 is essentially a cylindrical tube 43 of conducting material such as silver plated brass. A coupling loop 44 is disposed opposite the insertion loop 41, and preferably in the same plane thereof. Loop 44 is mounted on a grounding disc 45 having a depending metallic apron 46 in continuous contact with the interior of guide tube 43.

The coaxial tube assembly 30 extends from the center of grounding disc 45, and conducts central terminal 47 of coupling loop 44 through rod 50 to output cable 34. The outer shell of coaxial tube 30 is connected to the grounding disc 45. Insertion loop 41 is permanently mounted at the input end of guide tube 43; with coupling loop 44 being variably positioned longitudinally within guide tube 43 dependent upon the frequency to be probed. The characteristic impedance of exemplary coaxial assembly 30 is 50 ohms, and delivers an unbalanced line output to cable 34 for meter 35. It is noted that the dipole antenna 16, 16 is extended to the one-half wave length of the incident frequency power; and scale 31 of the coaxial tube 30 is set with respect to edge 32 of locking section 28 to adjust the spacing between the loop antennnae 41 and 44 within below cut-off wave guide 40 in accordance with a calibration chart, to be described in more detail in connection with FIG. 8 hereinafter.

FIG. 3 is a cross-sectional view through the exemplary probe 15. The insulation boom 20 is secured at one end in the disc 42. The antenna support 18 is inserted at the outer end of boom 20, and set screws 48, 48 fasten the dipole antenna 16, 16 thereto. The plug 24 is mounted at the end of support 18. Twin conductor 22 connects each side of the dipole antenna 16, 16 to insertion loop 41 at the input of the below cut-off wave guide 40. Loop 41 is mounted suitably on insulation member 49 in turn supported at the interior end of boom 20.

The below cut-off wave guide tube 43 is snugly fitted within insulation handle 21. Thus no manual contact with the signal or electrical system is made during handling of the probe 15. Terminal 47 of coupling loop 44 is secured to a projection of central conductor 50 of coaxial assembly 30. The opposite terminal 51 of loop 44 is supported on grounding disc 45. The loops 41 and 44 are made of stiff wire, and are self supporting. As previously stated, they are preferably in the same plane and of similar size. Their effective area determines the amount of pickup between the loops, as does the distance separating them. The loops 41 and 44, together with the associated elements upon which they are mounted and connected, are made of rigid material to maintain the predetermined calibrations for repetitive settings necessary in utilization of the probe 15.

For a given construction, the amount of energy output of probe 15 at its coaxial terminal 33', for connector 33, is proportional to the spacing between insertion loop 41 and coupling loop 44. The dotted position 44' of coupling loop 44 is indicated in FIG. 3 to show the variable positioning thereof in operation of the probe 15. The depending apron of spring fingers 46, continuously pressed against the interior of guide tube 43, maintains grounding disc 45 at ground potential. The position of the disc 45 in guide tube 43 determines the calibration effective for the below cut-off wave guide for a given frequency, and is preset by the scale 31 as will be set forth.

In the exemplary probe 15, constructed for measurements in the frequency range of 200 to 800 megacycles, a wave guide (40) configuration is used with its geometry suitable for efficiently transmitting 3,500 megacycles and up. In other words, for the desired below cut-off action in the 0.2 to 0.8 kmc. range, where a low pass filter action is effective, a 3.5 kmc. wave guide configuration is used, namely one that transmits microwaves at 3.5 kmc. and upwards (e.g. to 7 kmc.) with negligible attenuation and low VSWR. Such a tube (43), in the exemplary unit, has an internal diameter of 1 15/16 inches. While tube 43 would efficiently transmit microwaves above 3.5 kmc., it sharply attenuates the frequencies in the probe range of 0.2 to 0.8 kmc.

Although we have selected approximately 2 inches as the diameter for guide tube 43 for the indicated probe frequency range, it is to be understood that other diameters are feasible, with corresponding calibrations therefor. An approximate 2 inch diameter guide tube 43, and surrounding handle 21, makes a convenient size for manual gripping in the operation and setting of the probe 15. The essential factor is that, for the probe frequency range, the wave guide be in the below cut-off mode. It is desirable to utilize a below cut-off wave guide configuration that provides close to non-linear attenuation of the frequency range with displacements between loops 41 and 44, in order to derive as much of an expanded scale 31 as practicable in the probe's frequency range.

By suitably adjusting the distance between excitation loop 41 and coupling loop 44 in accordance with a predetermined scale (31) setting for the received frequency an effective reflection occurs from grounding disc 45 including loop 44 back to the excitation loop 41, creating an effective impedance at the excitation loop 41 and back to the dipole antenna 16, 16. Accordingly, the actual radio power dissipated within the unit 15, including the excitation loop 41 is relatively low. Also, a negligible loss occurs in the below cut-off wave guide 40. By moving the grounding disc 45 within the guide tube 43, we in effect correspondingly change the length of the below cut-off wave guide 40, and the energy pickup by coupling loop 44 is proportional to its spacing from excitation loop 41. A greater separation results in a smaller energy pickup and feed to output connector 33'. Such pickup characteristic is not linear but corresponds to the below cut-off attenuation characteristic of the wave guide 40 in the range of the probe 15 frequencies.

The coaxial tube assembly 30 comprises a brass tube 51 suitably silver plated, and in the exemplary probe a diameter of approximately ½ inch. As seen in FIG. 4, centrally of tube 51 is the conductor 50, preferably a brass rod ⅛ inch in diameter. Filling the space between rod 50 and tube 51 is a cylinder 52 of good dielectric material, preferably "Teflon." The result is a characteristic impedance of 50 ohms for line 30. With coupling loop 44 connected to coaxial tube 30 as described, an unbalanced output of 50 ohms results at terminal connection 33', with one side at ground potential. A specific air space 53 is provided between the end 52' of Teflon cylinder 52 and connector nut 54. The connector nut 54 extends from body 56 of the connector terminal 33', and is machined to fit within coaxial tube 51. It is soldered in place, and provides a continuous path for signal transmission where the outer conductor 51, 56 changes its diameter, namely at radial positions 57, 57'. The Teflon cylinder 58 within connector 33' extends across air space 52, by .030 inch (58') in this embodiment, at a reduced diameter. The axial connector pin 50a extends across extension 58' and connects with central rod 50 of the coaxial assembly 30.

FIG. 5 illustrates the coaxial assembly 30 in cross-section centrally of the below cut-off wave guide tube 43. The guide element 27 surrounds the coaxial tube 51 and is mounted at the end of guide tube 43 through disc 27' thereof (see FIG. 3). Ribs 59, 59 are preferably used, projecting along the coaxial tube 53, into corresponding grooves in guide member 27, to maintain a fixed angular orientation of the coaxial tube assembly 30 in its longitudinal displacements across guide 27 and within the below cut-off wave guide 40. In this manner the coplanar orientation of loop 44 is maintained with respect to fixed loop 41.

The guide element 27 projecting from the body of probe 15 has its end section 28 slotted with a number of equispaced milled segments, as is seen in enlarged FIG. 6. The slots at 28 are fully through the tube 27 in order to serve as a locking means upon thte coaxial tube assembly 30 when the latter adjusted to a scale position. Each of the slotted segments (28) act as a spring finger to lock against and hold assembly 30 when in its set position. Suitable material for the guide and lock section 27 is brass, silver plated. The central portion of the slotted section (28) has a raised threaded region 60.

The guided locking assembly 27 is proportioned to close the finger segments 28 upon tube 30 upon threading of the lock nut 26 over threaded region 60. By removing the lock nut 26 from threaded region 60, the segments (28) are relieved of pressure on tube 30, and it is then easy to longitudinally displace tube 30 to another scale position. The leading edge 32 of the segments 28 is the index for scale 31 on cylindrical tube 30. The scale 31 is marked preferably linearly, in fractions of an inch. In the exemplary unit the overall swing or longitudinal displacement of tube 30 along guide 27 is made in the order of 2 inches. The exemplary scale 31 is marked in thirty-seconds of an inch, although other desirable markings are feasible, such as decimal markings. The scale 31 markings are related to the calibration curve, as FIG. 8, and its sole purpose is to permit the longitudinal or axial setting of the coaxial assembly 30 and coupling loop 44 within the below cut-off wave guide 40 and with respect to insertion loop 41.

FIG. 7 illustrates in cross-section a probe 15′ with an alternate form for the insertion loop 41 of FIGS. 2 and 3. We have found that intercoupling between loops 41 and 44 may in some instances cause an erroneous reading due to the unbalanced nature of one of the loops (44) with respect to the balanced loop (41). Instead of compensating therefor, one may instead utilize two aligned rods 61, 61 set up in place of insertion loop 41, connected by the terminal leads 62, 62 of cable 22. The outer ends of rods 61, 61 are suitably supported from metallic tube 43 of the probe 15′ radially interiorly as by screws 63, 63. Rods 61, 61 are electrically grounded at their ends in contact with outer concentric conductor 43. The rods 61, 61 in one embodiment were made of .125 inch diameter brass rods, silver plated, and each were ⅞ of an inch long.

Rods 61, 61 in effect form a small fixed electrical loop configuration, being aligned on a common axis. The alignment of rods 61, 61 is made parallel with the plane of the coupling loop 44. In all respects the operation of the rods 61, 61 as an excitation means is the same as that of excitation loop 41 described hereinabove. Its action in coupling with loop 44, and the below cut-off wave guide impedance reflection, is also identical.

It is known that an ordinary dipole such as 16, 16 when adjusted to a one-half wave length spread between its tips 25, 25 will, when properly terminated as by an excitation loop 41, excitation rods 61, 61 (FIG. 7) or the like, will pick-up about 2,000 watts when immersed in a 1 watt per square centimeter field at 200 megacycles; and correspondingly when tuned to 800 megacycles will pick up about 150 watts in the same field density of one watt per square centimeter at 800 megacycles. This indicates the trouble that prior art attempts encountered in measuring high intensity radio fields, as it is a large amount of wattage to dissipate in a portable instrument.

By use of the below cut-off wave guide 40 as an attenuator and impedance reflector (back to antenna 16, 16) as in the present invention, we create an effective impedance at the antenna 16, 16 and the excitation coil 41 (or rods 61), whereby the actual power that results in the probe 15 when set-up for a given frequency is of the order of only one watt (for the one watt per square centimeter field density). This demonstrates the extreme practical merit, application and usefulness of the below cut-off principle in the probe 15 arrangement in accordance with the present invention. Not only is the advantage of low power pickup afforded by the invention probes (15, 15′) but by suitably calibrating the spacing between coupling loop 44 and the excitation loop (41 or 61), we adjust the amount of power actually picked up by the excitation coil 44 and in turn transmitted to power bridge meter 35. For this purpose the scale 31 is provided to accurate preposition the coupling loop 44 within the below cut-off wave guide 40 in accordance with the frequency of the field to be probed, and established its physical spacing with the excitation loop 41 (or 61).

The aforesaid spacing of the coupling coil 44 is calibrated, in the exemplary probes 15, 15′ to a reference output at coupling terminal 33′ of one watt. Thus, at any frequency within the range of the exemplary instrument, namely 0.2 to 0.8 kmc., the calibration of scale 31 as set-up by a chart or calibation curve per FIG. 8, results in a one watt output reading at meter 37 when the dipole 16, 16 is immersed in a field strength of one watt per square centimeter, the dipole 16, 16 being of course also preset to the resonant half wave length for the frequency measured.

By preselection of a suitable wave guide configuration (40) for the effective frequency range of the probe 15 a relatively good attenuation per unit of spacing between the loops 41, 44 is afforded at the non-linear below cut-off attenuation region of the wave guide. In the 0.2 to 0.8 kmc. range hereof, the 3.5 kmc. and up wave guide size was selected for practical results. The slightly wavy calibration curve 65 of FIG. 8 is that of the exemplary probe constructed in accordance with the invention hereof, and with the coupling cable 34 and the connectors 33, 34′, in the indicated range of 200 to 800 megacycles. An idealized curve 66 is possible by more refined design and construction of the unit, but such extra cost not necessary. The spacing for any given frequency is set forth by the scale (31) readings that are calibrated, and results in repetitive readings and accurate indications of the incident power in which the dipole antenna 16, 16 is immersed.

The exemplary probe 15, for example, with a scale setting of eight-thirty-seconds of an inch, corresponded its setting for 787.5 megacycles at ordinate $a$. This means that coupling loop 44 is positioned quite close to the excitation loop 41 of FIG. 3 or to rods 61, 61 of FIG. 7, as the coaxial assembly 30 is almost all into guide 40 in order to provide a one watt output at the terminal 33′ of probe 15 when the dipole 16, 16 is immersed in a field of one watt per square centimeter at a frequency of 787.5 megacycles. Thus, when the field has a power density of one watt per square centimeter, the indicator of meter 37 (FIG. 1) indicates at 1, in the scale center. Should the field intensity be only 0.01 watt per square centimeter, then with the power level attenuator 36 set at X 0.01 the indicator 37 will also read at 1. Intermediate or other power levels will be accurately read and directly indicated by indicator 37, with the appropriate attenuator (36) setting.

The dipole 16, 16 and probe 15 is left at the site of the power density measurements, and the operator is either properly shielded or moved to a remote point with meter 35 interconnected by cable 34. When another frequency is to be measured, the corresponding probe scale position (31) is changed to correspond to the new frequency and dipole antenna 16, 16 readjusted to the new half wave length. Thus, for a frequency setting of 387.5 megacycles at ordinate $b$ of FIG. 8, the scale (31) setting according to calibration curve is 28 thirty-seconds. Similarly for 200 megacycles, for ordinate $c$, the scale setting for coaxial tube assembly 30 is seen to be one inch and 16 thirty-seconds.

Any other frequency setting of coaxial tube assembly 30 in the probe frequency range of 200 to 800 megacycles is readily derived from the calibration curve (actual) 65, or from a numerical chart corresponding thereto. The idealized dotted line curve 66 is indicated for explanatory purposes, and of course can be used for rough checking, or where accuracy is not necessary in certain measurements. It is noted that in the calibration curve of FIG. 8 a scale displacement of 1¼ inches provides a sweep over the range of 0.2 to 0.8 kmc. for the exemplary probe 15. Such displacement results in approximately a 20 db loss within the probe 15 at 800 megacycles, and a 30 db loss at 200 megacycles. This means that the below cut-off wave guide (40) and the adjustable positioning of coupling loop 44, provides an attenuation of about 100 in the 800 megacycle region, and an attenuation of approximately 1,000 in the 200 megacycle region.

The result is a relatively small size, light weight, and compact probe, with negligible heating thereof in operation, providing an extremely useful, relatively inexpensive device for radio power density measurements. The exemplary frequency range, the dimensions, and described arrangements were given for illustrative purposes. Changes in dimensions, frequency range, power levels, and construction may be made by those skilled in the art, within the spirit and scope of the invention. Also, for more refined accuracy of measurement a micrometer-type of adjustment unit attached to guide 27 and unit 30 may be used at scale 31, in the manner of micrometer calipers, as will be understood by those skilled in the art. For most applications in the field, the illustrated scale and lock nut means have been found practical. However, the said micrometer arrangement could be useful for precise laboratory purposes.

The system components are properly shielded, to make them insensitive to stray radio frequency fields. Also, due to its selective frequency action, stray fields are substantially attenuated before affecting the instrument readings. Substantially large overloads will not destroy component elements of the invention system; and when properly used with attenuator 36 can withstand all practical field power densities that may be encountered. The unit and system hereof are very simple to operate, readily learned to use, and directly calibrated for accurate reading in the field.

Although the present invention has been described in connection with exemplary embodiments thereof, modifications and variations thereof are feasible within the broader spirit and scope of the invention, as set forth in the following claims.

We claim:

1. A broadband probe of the power density of radio fields comprising an antenna tunable to the frequency of a field to be probed, a wave guide proportioned to substantially attenuate signals in the broadband, a boom extending from said wave guide mounting said antenna spaced therefrom, an antenna cable along the boom with its outer end connected to said antenna, insertion means mounted adjacent the boom end of said wave guide and connected to said antenna cable, a coupling loop movable within said wave guide in signal pick-up relation to said insertion means, and a coaxial line assembly displaceably mounted in said wave guide with said coupling loop secured to its inner section and connected therewith for electrical transmission of the picked-up signals to an output terminal.

2. A broadband probe of the power density of radio frequency fields comprising a dipole antenna tunable to the frequency of a field to be probed, a below cut-off wave guide proportioned to substantially attenuate signals of the frequencies of the broadband, a boom extending from said wave guide mounting said antenna spaced therefrom, an antenna cable along the boom with its outer end connected to said antenna, an excitation loop mounted in said wave guide and conductively connected to said antenna cable, a coupling loop axially movable within said wave guide in signal pick-up relation to said excitation loop, and a coaxial line assembly mounted for displacement in said wave guide with said coupling loop secured thereto and connected therewith for electrical transmission of the picked-up signals to the wave guide exterior, said assembly comprising a conductive tube maintained in conductive connection with said wave guide.

3. A broadband probe of the power density of radio fields in range of approximately 200 to 800 megacycles comprising a dipole antenna tunable to the frequency of a field to be probed, a below cut-off wave guide proportioned to substantially attenuate signals of the probed fields in said wave guide range, a boom extending from said wave guide mounting said antenna spaced therefrom, an antenna cable along the boom with its outer end connected to said antenna, insertion means mounted at the boom end of and coaxially in said wave guide and connected to said antenna cable, coupling means axially movable within said wave guide in signal pick-up relation to said insertion means, a coaxial line assembly displaceably mounted in said wave guide with said coupling means secured thereto and connected therewith for electrical transmission of the picked-up signals to the wave guide exterior, said assembly comprising a conductive tube maintained in conductive connection with said guide and a scale associated with said tube calibrated for positioning the coupling means axially within said wave guide in correspondence with the frequency of the field being probed.

4. A broadband probe of the power density of radio frequency fields comprising a dipole antenna tunable to the frequency of a field to be probed, a wave guide proportioned to be below cut-off over the range of the signals of the broadband, a boom extending from said wave guide mounting said antenna spaced therefrom, an antenna cable along the boom with its outer end connected to said antenna, an excitation loop mounted at one end of and coaxially in said wave guide and connected to said antenna cable, a coupling loop longitudinally movable within said wave guide in signal pick-up relation said excitation loop, a line assembly displaceably mounted in said wave guide with said coupling loop secured to its inner end and connected therewith for electrical transmission of the picked-up signals to an output terminal, and a scale on said assembly calibrated for locating the assembly and coupling loop to a position within the wave guide with respect to the excitation loop to establish a predetermined relationship of signal level output to power density of field input over the frequency band.

5. A radio probe as claimed in claim 2, further including means for locking said assembly in predetermined positions with respect to said wave guide for probing fields of corresponding predetermined frequencies including a guide tube coaxial about the assembly tube and joined to the wave guide.

6. A radio probe as claimed in claim 3, further including means for locking the assembly tube in a preset scale position with respect to said wave guide for probing the field at a corresponding frequency including a guide tube coaxial about the assembly tube, said guide tube having a slotted end portion coactable with a locknut for gripping the slotted end with the assembly tube.

7. A radio probe as claimed in claim 4, further including means for locking said assembly in a calibrated scale position with respect to said wave guide for probing the field at a corresponding frequency including a guide tube having a slotted end portion coactable with a locknut for gripping the slotted end with the assembly.

8. A radio probe as claimed in claim 2, in which one terminal of the excitation loop is connected to the assembly body to establish an unbalanced line output mode at the output terminal.

9. A radio probe as claimed in claim 3, in which one terminal of the coupling means is connected to the assembly tube to establish an unbalanced line output mode for the probe.

References Cited in the file of this patent

UNITED STATES PATENTS

| | | |
|---|---|---|
| 1,921,117 | Darbord | Aug. 8, 1933 |
| 2,204,179 | George | June 11, 1940 |
| 2,293,112 | Carlson | Aug. 18, 1942 |
| 2,516,060 | Levenson | July 18, 1950 |
| 2,557,110 | Jaynes | June 19, 1951 |
| 2,666,183 | Ocnaschek | Jan. 12, 1954 |
| 2,684,462 | Tyzzer | July 20, 1954 |
| 2,933,684 | Selby et al. | Apr. 19, 1960 |

FOREIGN PATENTS

| | | |
|---|---|---|
| 1,009,679 | Germany | June 6, 1957 |